United States Patent
Satou et al.

(10) Patent No.: US 10,483,777 B2
(45) Date of Patent: Nov. 19, 2019

(54) AUXILIARY POWER SUPPLY DEVICE AND POWER SUPPLY SYSTEM

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Fumihiko Satou, Kashiwara (JP); Toyoki Sugiyama, Kitakatsuragi-gun (JP); Masataka Okuda, Toyota (JP); Hidefumi Kamikawa, Okazaki (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 15/867,857

(22) Filed: Jan. 11, 2018

(65) Prior Publication Data

US 2018/0205251 A1    Jul. 19, 2018

(30) Foreign Application Priority Data

Jan. 17, 2017   (JP) .................................. 2017-006023

(51) Int. Cl.
| | |
|---|---|
| *H02J 7/00* | (2006.01) |
| *H02J 7/34* | (2006.01) |
| *B60R 16/02* | (2006.01) |

(52) U.S. Cl.
CPC ............ *H02J 7/0052* (2013.01); *B60R 16/02* (2013.01); *H02J 7/345* (2013.01)

(58) Field of Classification Search
CPC ........ H02J 7/0052; H02J 9/061; H02J 7/0068; H02J 7/345; H02J 2009/068; B62D 5/046; B62D 5/06; B60R 16/02

USPC .......................................................... 320/166
See application file for complete search history.

(56) References Cited

U.S. PATENT DOCUMENTS

| | | | | |
|---|---|---|---|---|
| 6,265,851 | B1 * | 7/2001 | Brien ..................... | H02J 7/0018 |
| | | | | 320/162 |
| 9,126,620 | B2 * | 9/2015 | Sugiyama ............ | B62D 5/0475 |
| 9,694,819 | B2 * | 7/2017 | Honda ..................... | B60K 1/02 |
| 9,735,774 | B2 * | 8/2017 | Otsuka ....................... | B41J 2/07 |

(Continued)

FOREIGN PATENT DOCUMENTS

| | | |
|---|---|---|
| EP | 1848090 A2 | 10/2007 |
| EP | 2733046 A2 | 5/2014 |

(Continued)

OTHER PUBLICATIONS

May 28, 2018 Extended European Search Report issued in European Application No. 18151398.7.

*Primary Examiner* — M Baye Diao
(74) *Attorney, Agent, or Firm* — Oliff PLC

(57) ABSTRACT

An auxiliary power supply device includes: a plurality of channels of auxiliary power supplies; a charging circuit; and an auxiliary power supply switching circuit disposed between the charging circuit and positive electrode terminals of the plurality of channels of auxiliary power supplies and configured to switch one channel of auxiliary power supply connected to the charging circuit among the plurality of channels of auxiliary power supplies and to simultaneously switch one channel of auxiliary power supply connected to a power supply destination so as not to match the channel of auxiliary power supply connected to the charging circuit.

4 Claims, 6 Drawing Sheets

(56) References Cited

U.S. PATENT DOCUMENTS

| | | | | |
|---|---|---|---|---|
| 9,816,871 B2* | 11/2017 | Eberlein | ................... | G01K 7/01 |
| 2014/0218981 A1* | 8/2014 | Harada | ................... | H02M 1/36 |
| | | | | 363/49 |
| 2014/0222294 A1* | 8/2014 | Sugiyama | .............. | B62D 5/046 |
| | | | | 701/42 |
| 2017/0063150 A1* | 3/2017 | Sakamoto | ............. | H01M 10/44 |

FOREIGN PATENT DOCUMENTS

| | | |
|---|---|---|
| JP | 2009-061794 A | 3/2009 |
| JP | 2014-150672 A | 8/2014 |
| WO | 2015/198704 A1 | 12/2015 |

* cited by examiner

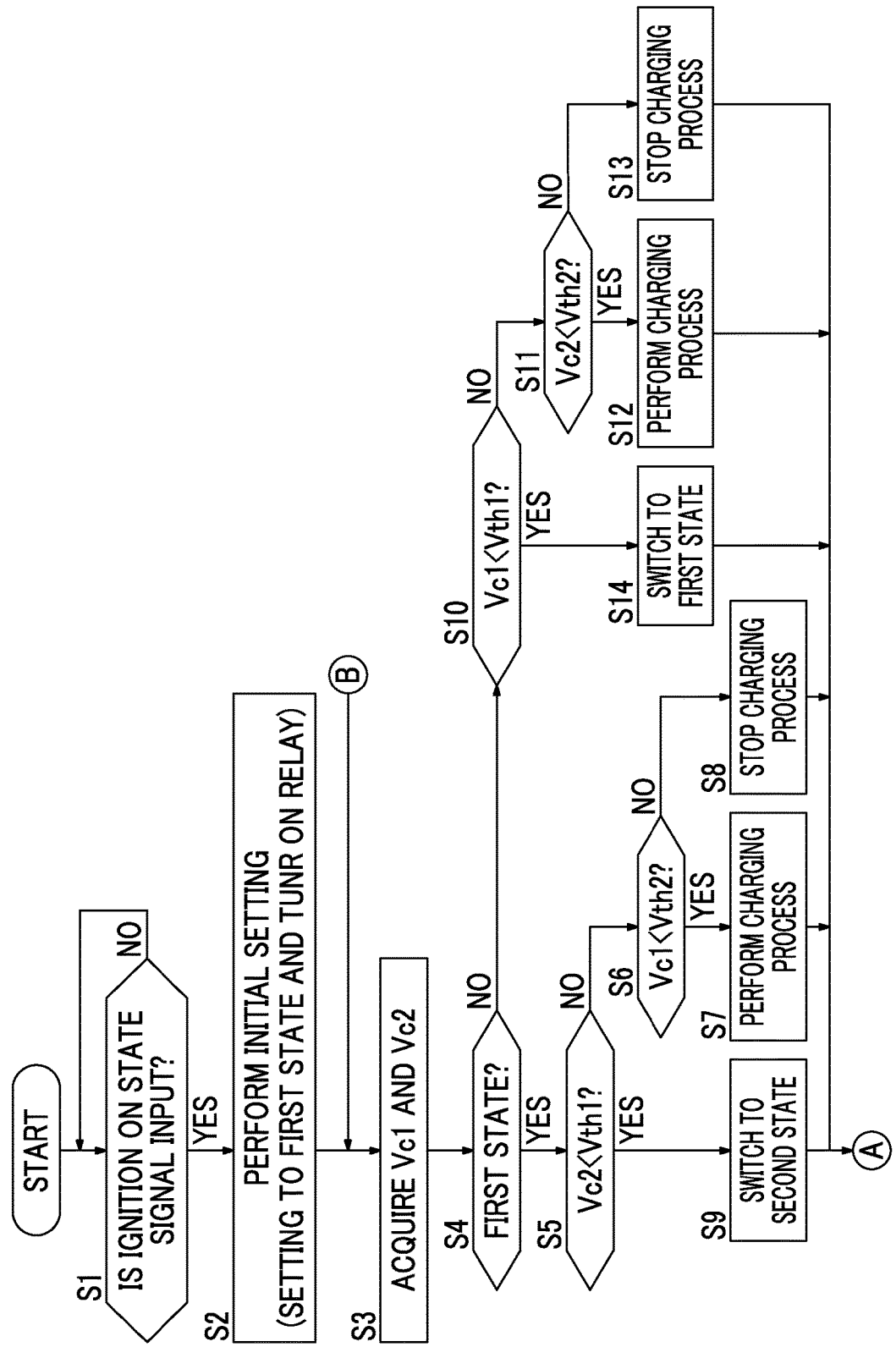

AUXILIARY POWER SUPPLY DEVICE AND POWER SUPPLY SYSTEM

INCORPORATION BY REFERENCE

The disclosure of Japanese Patent Application No. 2017-006023 filed on Jan. 17, 2017 including the specification, drawings and abstract is incorporated herein by reference in its entirety.

BACKGROUND

1. Technical Field

The disclosure relates to an auxiliary power supply device and a power supply system including the auxiliary power supply device.

2. Description of Related Art

Japanese Unexamined Patent Application Publication No. 2014-150672 (JP 2014-150672 A) discloses an auxiliary power supply device that supplies electric power to a driving circuit of electric motor for electric power steering (EPS). The auxiliary power supply device described in JP 2014-150672 A includes a single auxiliary power supply that is connected to a main power supply, a charging circuit that charges the auxiliary power supply based on the main power supply, and a switching circuit (a discharging circuit) that switches a power supply state between a normal output voltage state in which electric power is supplied to the driving circuit using only the main power supply and a high output voltage state in which electric power is supplied to the driving circuit using both the main power supply and the auxiliary power supply by discharging of the auxiliary power supply.

When a high load is applied to the EPS, the switching circuit sets the power supply state to the high output voltage state. In this case, the auxiliary power supply is in a discharging state. On the other hand, when a low load is applied to the EPS, the switching circuit sets the power supply state to the normal output voltage state and charges the auxiliary power supply.

SUMMARY

In the auxiliary power supply device described in JP 2014-150672 A, charging and discharging are not simultaneously performed on the same auxiliary power supply and the voltage applied to the driving circuit decreases at the time of charging of the auxiliary power supply. Accordingly, it is difficult to continuously maintain the high output voltage state. The disclosure provides an auxiliary power supply device and a power supply system that can continuously maintain a high output voltage state.

An auxiliary power supply device according to a first aspect of the disclosure includes: a plurality of channels of auxiliary power supplies; a charging circuit configured to charge the auxiliary power supplies, the charging circuit being connected to a main power supply; and an auxiliary power supply switching circuit disposed between the charging circuit and positive electrode terminals of the plurality of channels of auxiliary power supplies and configured to switch one channel of auxiliary power supply connected to the charging circuit among the plurality of channels of auxiliary power supplies and to simultaneously switch one channel of auxiliary power supply connected to a power supply destination so as not to match the one channel of auxiliary power supply connected to the charging circuit.

According to this configuration, one channel of auxiliary power supply among the plurality of channels of auxiliary power supplies can be connected to the power supply destination to discharge the auxiliary power supply, and one channel of auxiliary power supply among the other channels of auxiliary power supplies can be connected to the charging circuit to charge the auxiliary power supply. One channel of auxiliary power supply connected to the charging circuit can be switched to another channel of auxiliary power supply and one channel of auxiliary power supply connected to the power supply destination can be simultaneously switched to another channel of auxiliary power supply other than the channel of auxiliary power supply connected to the charging circuit. Accordingly, it is possible to continuously maintain the high output voltage state.

In the aspect, the plurality of channels of auxiliary power supplies may include a first auxiliary power supply and a second auxiliary power supply, and the auxiliary power supply switching circuit may be configured to be switched between a first state in which the first auxiliary power supply is connected to the charging circuit and the second auxiliary power supply is connected to the power supply destination and a second state in which the first auxiliary power supply is connected to the power supply destination and the second auxiliary power supply is connected to the charging circuit.

A power supply system according to a second aspect of the disclosure includes: the auxiliary power supply device; a first voltage detector configured to detect a first voltage which is an inter-terminal voltage of the first auxiliary power supply; a second voltage detector configured to detect a second voltage which is an inter-terminal voltage of the second auxiliary power supply; and a control device configured to control the auxiliary power supply device. The control device is configured to switch the auxiliary power supply switching circuit to the second state when the auxiliary power supply switching circuit is in the first state and the second voltage detected by the second voltage detector is less than a predetermined first threshold value and to switch the auxiliary power supply switching circuit to the first state when the auxiliary power supply switching circuit is in the second state and the first voltage detected by the first voltage detector is less than the first threshold value.

In the aspect, the control device may control the charging circuit such that the first auxiliary power supply is charged only when the auxiliary power supply switching circuit is in the first state and the first voltage detected by the first voltage detector is less than a predetermined second threshold value and may control the charging circuit such that the second auxiliary power supply is charged only when the auxiliary power supply switching circuit is in the second state and the second voltage detected by the second voltage detector is less than the second threshold value.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a part of a flowchart illustrating an operation example of a power supply control ECU;

DETAILED DESCRIPTION OF EMBODIMENTS

Figure 1:
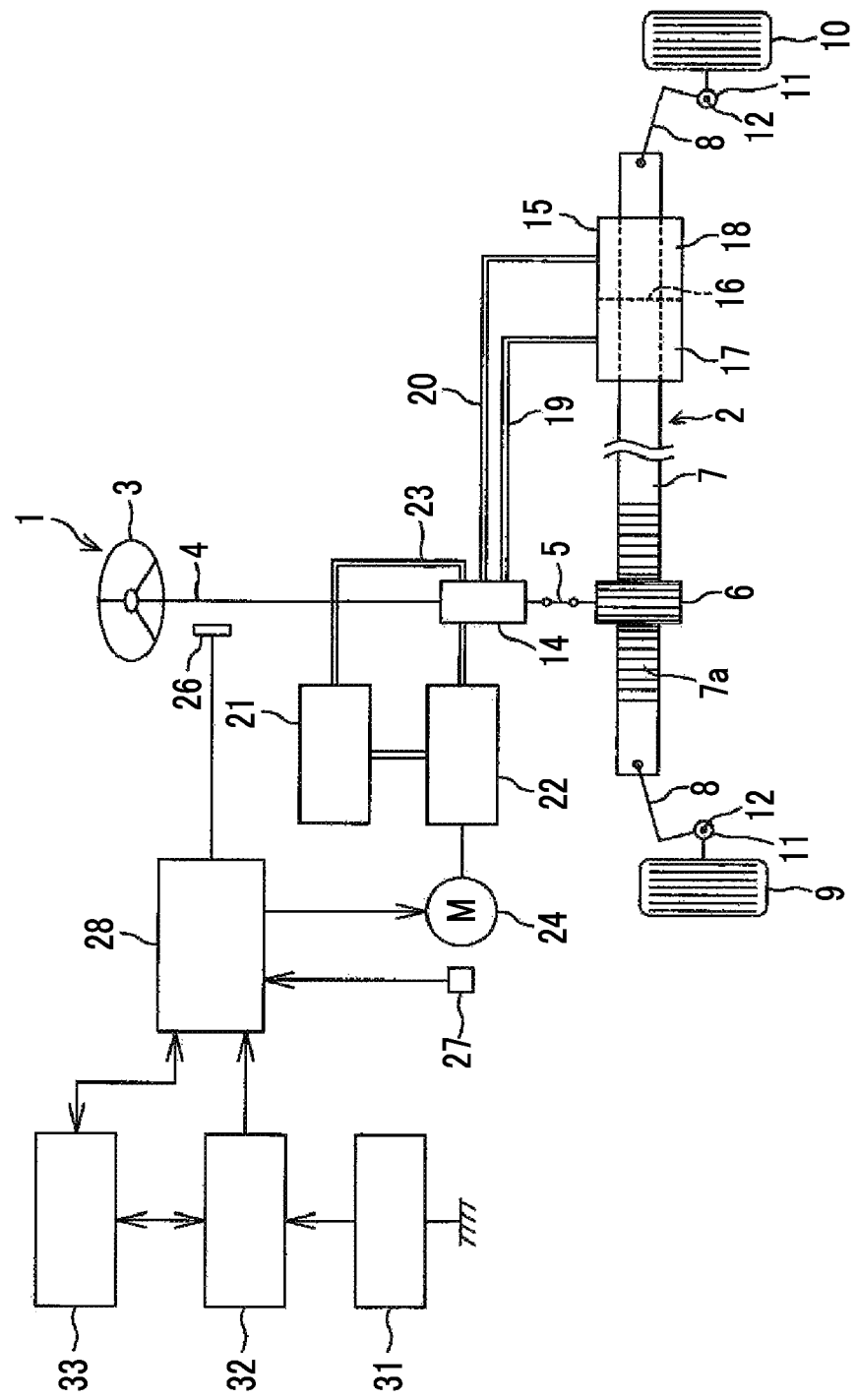
FIG. 1 is a diagram schematically illustrating a configuration of an electro-hydraulic power steering device to which an auxiliary power supply device according to the disclosure is applied.

Hereinafter, an embodiment of the disclosure will be described in detail with reference to the accompanying drawings. FIG. 1 is a diagram schematically illustrating a configuration of an electro-hydraulic power steering (H-EPS) device to which an auxiliary power supply device according to the disclosure is applied. The electro-hydraulic power steering device 1 is provided in association with a steering mechanism 2 of a vehicle and serves to apply an auxiliary steering force to the steering mechanism 2.

The steering mechanism 2 includes a steering wheel 3 serving as a steering member that is operated by a driver for the purpose of steering a vehicle, a steering shaft 4 that is connected to the steering wheel 3, a pinion shaft 5 that is connected to a tip of the steering shaft 4 via a hydraulic control valve 14 and includes a pinion gear 6, and a rack shaft 7 serving as a turning shaft that includes a rack gear portion 7a engaging with the pinion gear 6 and extends in a right-left direction of the vehicle.

Tie rods 8 are connected to both ends of the rack shaft 7, and the tie rods 8 are connected to knuckle arms 11 that support right and left turning wheels 10 and 9. Each knuckle arm 11 is provided to be rotatable about a king pin 12. When the steering wheel 3 is operated and the steering shaft 4 rotates, this rotational motion is converted into a rectilinear motion in an axial direction of the rack shaft 7 by the pinion gear 6 and the rack gear portion 7a. The rectilinear motion is converted into a rotational motion of each knuckle arm 11 about the king pin 12 and thus turning of the right and left turning wheels 10 and 9 is achieved.

The hydraulic control valve 14 is a rotary valve and includes a sleeve valve element (not illustrated) that is connected to the steering shaft 4, a shaft valve element (not illustrated) that is connected to the pinion shaft 5, and a torsion bar (not illustrated) that connects both valve elements. The torsion bar causes torsion depending on a direction and a magnitude of a steering torque applied to the steering wheel 3, and an opening degree of the hydraulic control valve 14 varies depending on a direction and a magnitude of the torsion of the torsion bar.

The hydraulic control valve 14 is connected to a power cylinder 15 that applies an auxiliary steering force to the steering mechanism 2. The power cylinder 15 includes a piston 16 that is provided integrally with the rack shaft 7 and a pair of cylinder chambers 17 and 18 that are partitioned by the piston 16. The cylinder chambers 17 and 18 are connected to the hydraulic control valve 14 via corresponding flow channels 19 and 20.

The hydraulic control valve 14 is disposed in the middle of an oil circulation passage 23 passing through a reservoir tank 21 and a hydraulic pump 22 for generating an auxiliary steering force. The hydraulic pump 22 is constituted, for example, by a gear pump, is driven by an electric motor 24, and pumps out a hydraulic oil stored in the reservoir tank 21 and supplies the hydraulic oil to the hydraulic control valve 14. An excessive hydraulic oil is returned from the hydraulic control valve 14 to the reservoir tank 21 via the oil circulation passage 23.

The electric motor 24 is rotationally driven in one direction to drive the hydraulic pump 22. Specifically, an output shaft of the electric motor 24 is connected to an input shaft of the hydraulic pump 22, and the input shaft of the hydraulic pump 22 rotates to achieve driving of the hydraulic pump 22 by rotation of the output shaft of the electric motor 24. When a torsion in one direction is applied to the torsion bar, the hydraulic control valve 14 supplies the hydraulic oil to one of the cylinder chambers 17 and 18 of the power cylinder 15 via one of the flow channels 19 and 20 and returns the hydraulic oil of the other cylinder chamber to the reservoir tank 21. When a torsion in the other direction is applied to the torsion bar, the hydraulic control valve 14 supplies the hydraulic oil to the other of the cylinder chambers 17 and 18 via the other of the flow channels 19 and 20 and returns the hydraulic oil in the one cylinder chamber to the reservoir tank 21.

When little torsion is applied to the torsion bar, the hydraulic control valve 14 enters a so-called equilibrium state, both cylinder chambers 17 and 18 of the power cylinder 15 at a steering neutral position are maintained at the same pressure, and the hydraulic oil circulates in the oil circulation passage 23. When both valve elements of the hydraulic control valve 14 rotate relative to each other due to steering, the hydraulic oil is supplied to one of the cylinder chambers 17 and 18 of the power cylinder 15 and the piston 16 moves in the vehicle width direction (the right-left direction of the vehicle). Accordingly, an auxiliary steering force is applied to the rack shaft 7.

The vehicle includes sensors such as a steering angle sensor 26 that detects a steering angle $\theta h$ of the steering wheel 3 which is operated by the driver and a rotation angle sensor 27 that detects a rotation angle $\theta m$ of a rotor of the electric motor 24. The steering angle $\theta h$ detected by the steering angle sensor 26 and the rotation angle $\theta m$ of the rotor detected by the rotation angle sensor 27 are input to an H-EPS electronic control unit (ECU) 28. The H-EPS ECU 28 controls the electric motor 24 based on such inputs and the like.

Figure 2:
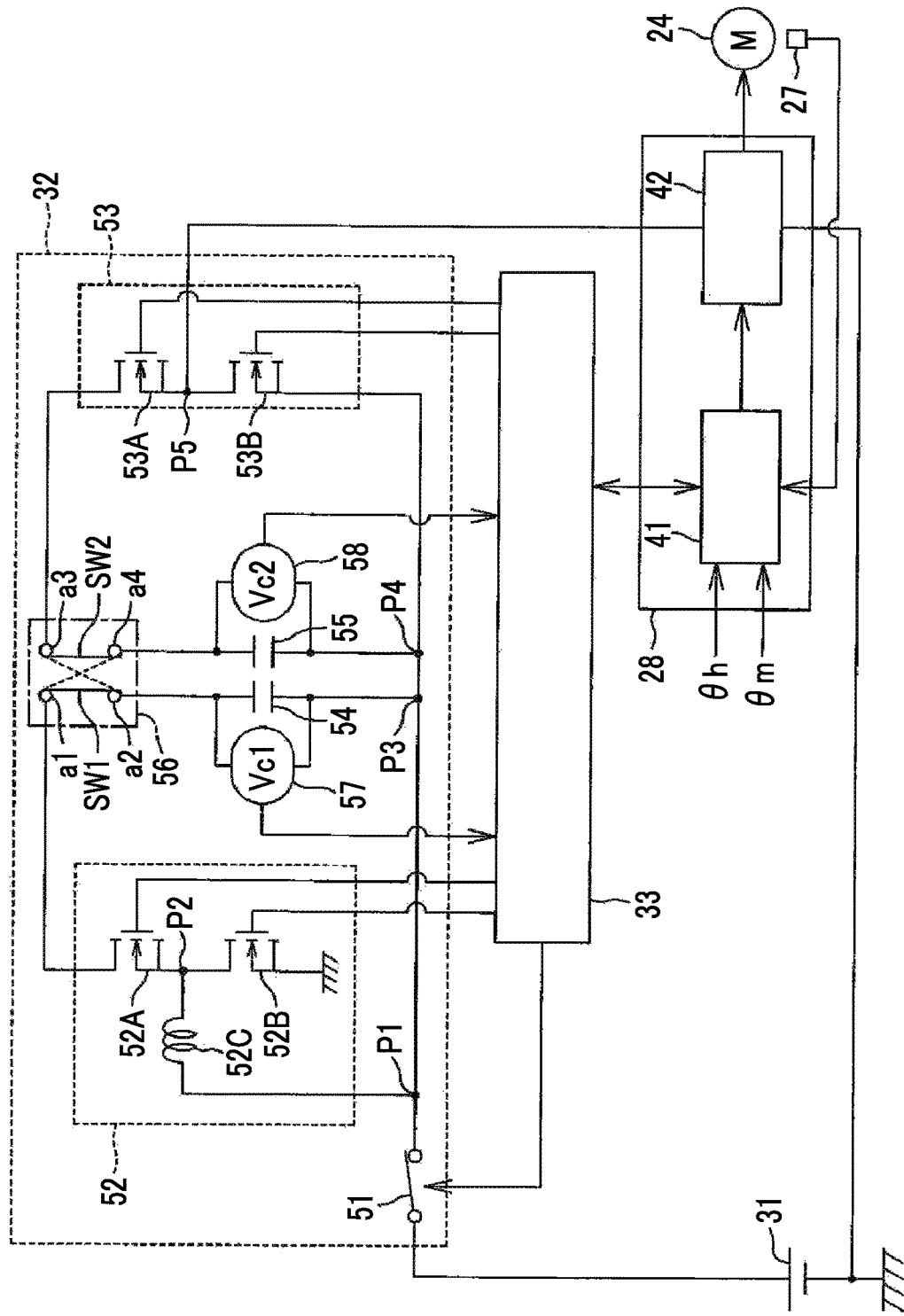
FIG. 2 is a circuit diagram illustrating an example of an electrical configuration of the electro-hydraulic power steering device.

The vehicle includes an auxiliary power supply device 32 in addition to a main power supply 31. The auxiliary power supply device 32 is controlled by a power supply control ECU 33. The H-EPS ECU 28 and the power supply control ECU 33 are connected to each other via a communication line. FIG. 2 is a circuit diagram illustrating an example of an electrical configuration of the electro-hydraulic power steering device 1.

The H-EPS ECU 28 includes a motor control circuit 41 that is constituted by a microcomputer and a motor driving circuit (a power supply destination) 42 that is controlled by the motor control circuit 41 and supplies electric power to the electric motor 24. The motor driving circuit 42 includes an inverter circuit. The steering angle $\theta h$ detected by the steering angle sensor 26, the rotation angle $\theta m$ of the rotor detected by the rotation angle sensor 27, and the like are input to the H-EPS ECU 28.

The motor control circuit 41 controls the motor driving circuit 42 as follows. That is, the motor control circuit 41 calculates a steering angular velocity by differentiating the steering angle $\theta h$ detected by the steering angle sensor 26 with respect to time and sets a target rotation speed which is a target value of the rotation speed of the electric motor 24 based on the acquired steering angular velocity. The motor control circuit 41 calculates the rotation speed of the electric motor 24 based on the rotation angle θm of the rotor detected by the rotation angle sensor 27. The motor control circuit 41 controls driving of the motor driving circuit 42 such that the rotation speed of the electric motor 24 is equal to the target rotation speed.

The auxiliary power supply device 32 is connected in series to the main power supply 31. The auxiliary power supply device 32 includes a relay 51, a charging circuit 52, a discharging circuit 53, two channels of capacitors 54 and 55 serving as a plurality of channels of auxiliary power supplies, an auxiliary power supply switching circuit 56, and two voltage sensors 57 and 58. In this embodiment, each channel of capacitor includes a single capacitor 54 or 55. The capacitances of the two capacitors 54 and 55 are substantially the same. In the following description, one capacitor 54 may be referred to as a first capacitor 54 and the other capacitor 55 may be referred to as a second capacitor 55.

The auxiliary power supply switching circuit 56 includes a first switch SW1 and a second switch SW2. The first switch SW1 connects a first contact a1 to a second contact a2 or a fourth contact a4. The second switch SW2 connects a third contact a3 to the fourth contact a4 or the second contact a2. The relay 51 is disposed between a positive electrode terminal of the main power supply 31 and the charging circuit 52. A connection point of the relay 51 and the charging circuit 52 is denoted by P1. The charging circuit 52 is a circuit that charges the capacitors 54 and 55. The charging circuit 52 includes a pair of switching elements 52A and 52B connected in series and a booster coil 52C connected between a connection point P2 of the switching elements 52A and 52B and the connection point P1. Each of the switching elements 52A and 52B is formed of an n-channel MOSFET.

The source of the switching element 52A on an upper stage side is connected to the drain of the switching element 52B on a lower stage side. The drain of the switching element 52A on the upper stage side is connected to the first contact a1 of the auxiliary power supply switching circuit 56. The source of the switching element 52B on the lower stage side is grounded. The first capacitor 54 is connected between the connection point P1 and the second contact a2 of the auxiliary power supply switching circuit 56. More specifically, a negative electrode terminal of the first capacitor 54 is connected to the connection point P1 via the connection point P3, and a positive electrode terminal of the first capacitor 54 is connected to the second contact a2.

The second capacitor 55 is connected between the connection point P3 between the connection point P1 and the first capacitor 54 and the fourth contact a4 of the auxiliary power supply switching circuit 56. More specifically, a negative electrode terminal of the second capacitor 55 is connected to the connection point P3 via the connection point P4, and a positive electrode terminal of the second capacitor 55 is connected to the fourth contact a4. The connection points P1, P3, and P4 are electrically connected to each other.

The discharging circuit 53 is connected between the connection point P4 between the connection point P3 and the second capacitor 55 and the third contact a3 of the auxiliary power supply switching circuit 56. The discharging circuit 53 includes a pair of switching elements 53A and 53B connected in series. Each of the switching elements 53A and 53B is formed of an n-channel MOSFET. The source of the switching element 53A on an upper stage side is connected to the drain of the switching element 53B on a lower stage side. The drain of the switching element 53A on the upper stage side is connected to the third contact a3. The source of the switching element 53B on the lower stage side is connected to the connection point P4. The connection point P5 between the switching elements 53A and 53B is connected to the motor driving circuit 42 in the H-EPS ECU 28.

The auxiliary power supply switching circuit 56 switches one auxiliary power supply connected to the charging circuit 52 among a plurality of auxiliary power supplies 54 and 55 and simultaneously switches one auxiliary power supply connected to the motor driving circuit 42 so as not to match the auxiliary power supply connected to the charging circuit 52. Specifically, the auxiliary power supply switching circuit 56 includes the first switch SW1 and the second switch Sw2, and switches a connection state between a first state indicated by a solid line in FIG. 2 and a second state indicated by a dotted line in FIG. 2. In the first state, the first switch SW1 connects the first contact a1 to the second contact a2, and the second switch SW2 connects the third contact a3 to the fourth contact a4. On the other hand, in the second state, the first switch SW1 connects the first contact a1 to the fourth contact a4, and the second switch SW2 connects the third contact a3 to the second contact a2.

In the first state, when the switching elements 52A and 52B in the charging circuit 52 are alternately turned on, an output voltage (a battery voltage) at the connection point P1 can be boosted up and applied to the positive electrode terminal of the first capacitor 54 and thus the first capacitor 54 can be charged. In the first state, when the switching element 53B on the lower stage side in the discharging circuit 53 is turned off and the switching element 53A on the upper stage side is turned on, the second capacitor 55 discharges power. Accordingly, a voltage obtained by adding the capacitor voltage of the second capacitor 55 to the voltage of the main power supply 31 is applied to the motor driving circuit 42. In this way, when the auxiliary power supply switching circuit 56 is in the first state, it is possible to discharge power from the second capacitor 55 and to charge the first capacitor 54.

In the second state, when the switching elements 52A and 52B in the charging circuit 52 are alternately turned on, an output voltage (a battery voltage) at the connection point P1 can be boosted up and applied to the positive electrode terminal of the second capacitor 55 and thus the second capacitor 55 can be charged. In the second state, when the switching element 53B on the lower stage side in the discharging circuit 53 is turned off and the switching element 53A on the upper stage side is turned on, the first capacitor 54 discharges power. Accordingly, a voltage obtained by adding the capacitor voltage of the first capacitor 54 to the voltage of the main power supply 31 is applied to the motor driving circuit 42. In this way, when the auxiliary power supply switching circuit 56 is in the second state, it is possible to discharge power from the first capacitor 54 and to charge the second capacitor 55. Accordingly, by alternately switching the auxiliary power supply switching circuit 56 between the first state and the second state, it is possible to maintain the output voltage of the auxiliary power supply device 32 in the high output voltage state in which the capacitor voltage of one capacitor is added to the output voltage of the main power supply 31.

Figure 3:
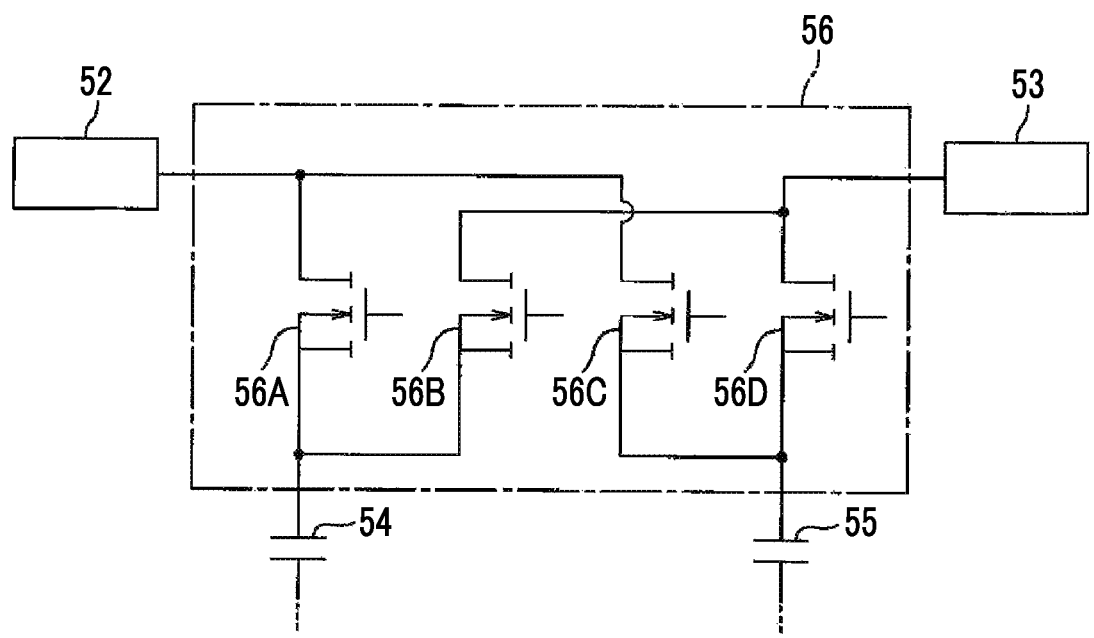
FIG. 3 is a circuit diagram illustrating an example of a specific configuration of an auxiliary power supply switching circuit.

FIG. 3 is a circuit diagram illustrating an example of a specific configuration of the auxiliary power supply switching circuit 56. The auxiliary power supply switching circuit 56 includes four switching elements of first to fourth switching elements 56A to 56D. Each of the switching elements 56A to 56D is formed of an n-channel MOSFET. The first switching element 56A is connected between the drain of the switching element 52A on the upper stage side in the charging circuit 52 and the positive electrode terminal of the first capacitor 54. The second switching element 56B is connected between the drain of the switching element 53A on the upper stage side in the discharging circuit 53 and the positive electrode terminal of the first capacitor 54.

The third switching element 56C is connected between the drain of the switching element 52A on the upper stage side in the charging circuit 52 and the positive electrode terminal of the second capacitor 55. The fourth switching element 56D is connected between the drain of the switching element 53A on the upper stage side in the discharging circuit 53 and the positive electrode terminal of the second capacitor 55. In the first state, the first switching element 56A and the fourth switching element 56D are turned on, and the second switching element 56B and the third switching element 56C are turned off. In the second state, the second switching element 56B and the third switching element 56C are turned on, and the first switching element 56A and the fourth switching element 56D are turned off.

Referring back to FIG. 2, the voltage sensor 57 detects an inter-terminal voltage of the first capacitor 54 (hereinafter referred to as a "first capacitor voltage $V_{c1}$"). The voltage sensor 58 detects an inter-terminal voltage of the second capacitor 55 (hereinafter referred to as a "second capacitor voltage $V_{c2}$"). The detected values of the sensor 57 and 58 are input to the power supply control ECU 33. An ignition state detection signal (not illustrated) indicating a state of an ignition key is input to the power supply control ECU 33.

The power supply control ECU 33 is constituted by a microcomputer. The microcomputer includes a CPU and a memory (a memory such as a ROM, a RAM, and a non-volatile memory) that stores a program and the like. The power supply control ECU 33 controls ON and OFF of the relay 51 based on the ignition state detection signal. When the ignition key is operated to be turned on, the ignition state detection signal (hereinafter referred to as an "ignition ON state signal") indicating the fact is input to the power supply control ECU 33. When the ignition ON state signal is input, the power supply control ECU 33 turns on the relay 51. On the other hand, when the ignition key is operated to be turned off, the ignition state detection signal (hereinafter referred to as an "ignition OFF state signal") indicating the operation is input to the power supply control ECU 33. When the ignition OFF state signal is input, the power supply control ECU 33 turns off the relay 51. In this embodiment, when the relay 51 is turned off, it is assumed that all the switching elements in the auxiliary power supply device 32 are turned off.

Figure 4B:
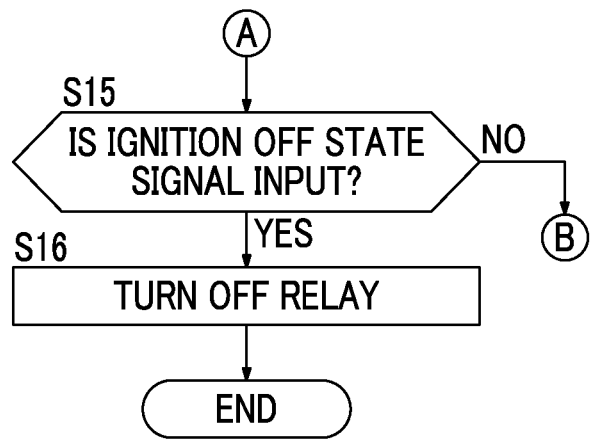
FIG. 4B is a part of a flowchart illustrating an operation example of the power supply control ECU.

The power supply control ECU 33 controls the switches SW1 and SW2 (the switching elements 56A to 56D) in the auxiliary power supply switching circuit 56, the switching elements 52A and 52B in the charging circuit 52, and the switching elements 53A to 53B in the discharging circuit 53 based on the detected value of the voltage sensors 57 and 58. FIGS. 4A and 4B are flowcharts illustrating an operation example of the power supply control ECU 33.

When the ignition ON state signal is input (Step S1: YES), the power supply control ECU 33 performs initial setting (Step S2). In the initial setting, the power supply control ECU 33 sets the auxiliary power supply switching circuit 56 to the first state. When the auxiliary power supply switching circuit 56 includes four switching elements 56A to 56D illustrated in FIG. 3, the power supply control ECU 33 turns on the first and fourth switching elements 56A and 56D and turns off the second and third switching elements 56B and 56C. The power supply control ECU 33 turns on the switching element 53A on the upper stage side in the discharging circuit 53 and turns off the switching element 53B on the lower stage side. The power supply control ECU 33 turns on the relay 51. Accordingly, the second capacitor C2 enters the discharging state.

Then, the power supply control ECU 33 acquires the first capacitor voltage $V_{c1}$ detected by the voltage sensor 57 and the second capacitor voltage $V_{c2}$ detected by the voltage sensor 58 (Step S3). Then, the power supply control ECU 33 determines whether the auxiliary power supply switching circuit 56 is in the first state (Step S4). When the auxiliary power supply switching circuit 56 is in the first state (Step S4: YES), the power supply control ECU 33 performs Step S5. In Step S5, the power supply control ECU 33 determines whether the second capacitor voltage $V_{c2}$ is less than a predetermined first threshold value $V_{th1}$ to determine whether the second capacitor 55 is maintained in the discharging state. The first threshold value $V_{th1}$ is set to the same value as a voltage which is considered to be required at least for maintaining the capacitors 54 and 55 in the discharging state or a value slightly greater than the voltage.

When the second capacitor voltage $V_{c2}$ is equal to or greater than the first threshold value $V_{th1}$ (Step S5: NO), the power supply control ECU 33 determines whether the first capacitor voltage $V_{c1}$ is equal to or less than a predetermined second threshold value $V_{th2}$ ($V_{th2} > V_{th1}$) (Step S6). This determination is performed to prevent overcharging of the first capacitor 54. The second threshold value $V_{th2}$ is set to the same value as an upper limit voltage of the capacitors 54 and 55 or a value slightly less than the upper limit voltage in this embodiment.

When the first capacitor voltage $V_{c1}$ is less than the second threshold value $V_{th2}$ (Step S6: YES), the power supply control ECU 33 performs a charging process (Step S7). Specifically, the power supply control ECU 33 alternately turns on the switching elements 52A and 52B in the charging circuit 52. Accordingly, charging of the first capacitor 54 is performed. When the process flow transitions from Step S6 to Step S7 and the charging process is being performed, the power supply control ECU 33 continues to perform the charging process. Then, the power supply control ECU 33 determines whether the ignition OFF state signal is input (Step S15). When the ignition OFF state signal is not input (Step S15: NO), the power supply control ECU 33 performs Step S3 again.

When it is determined in Step S6 that the first capacitor voltage $V_{c1}$ is equal to or greater than the second threshold value $V_{th2}$ (Step S6: NO), the power supply control ECU 33 stops the charging process to prevent overcharging of the first capacitor 54 (Step S8). Specifically, the power supply control ECU 33 turns off the switching elements 52A and 52B in the charging circuit 52. When the process flow transitions from Step S6 to Step S8 and the charging process is not performed, the power supply control ECU 33 maintains the state. Then, the power supply control ECU 33 determines whether the ignition OFF state signal is input (Step S15). When the ignition OFF state signal is not input (Step S15: NO), the power supply control ECU 33 performs Step S3 again.

When it is determined in Step S5 that the second capacitor voltage $V_{c2}$ is less than the first threshold value $V_{th1}$ (Step S5: YES), the power supply control ECU 33 switches the auxiliary power supply switching circuit 56 to the second state (Step S9). When the auxiliary power supply switching circuit 56 includes four switching elements 56A to 56D illustrated in FIG. 3, the power supply control ECU 33 turns off the first and fourth switching elements 56A and 56D and turns on the second and third switching elements 56B and 56C. Then, the power supply control ECU 33 determines whether the ignition OFF state signal is input (Step S15). When the ignition OFF state signal is not input (Step S15: NO), the power supply control ECU 33 performs Step S3 again.

When it is determined in Step S4 that the auxiliary power supply switching circuit 56 is in the second state (Step S4: NO), the power supply control ECU 33 performs Step S10. In Step S10, the power supply control ECU 33 determines whether the first capacitor voltage Vc1 is less than the first threshold value Vth1 to determine whether the first capacitor 54 can be maintained in the discharging state.

When the first capacitor voltage Vc1 is equal to or greater than the first threshold value Vth1 (Step S10: NO), the power supply control ECU 33 determines whether the second capacitor voltage Vc2 is equal to or less than the second threshold value Vth2 (Step S11). When the second capacitor voltage Vc2 is less than the second threshold value Vth2 (Step S11: YES), the power supply control ECU 33 performs a charging process (Step S12). Specifically, the power supply control ECU 33 alternately turns on the switching elements 52A and 52B in the charging circuit 52. Accordingly, charging of the second capacitor 55 is performed. When the process flow transitions from Step S11 to Step S12 and the charging process is being performed, the power supply control ECU 33 continues to perform the charging process. Then, the power supply control ECU 33 determines whether the ignition OFF state signal is input (Step S15). When the ignition OFF state signal is not input (Step S15: NO), the power supply control ECU 33 performs Step S3 again.

When it is determined in Step S11 that the second capacitor voltage Vc2 is equal to or greater than the second threshold value Vth2 (Step S11: NO), the power supply control ECU 33 stops the charging process to prevent overcharging of the second capacitor 55 (Step S13). Specifically, the power supply control ECU 33 turns off the switching elements 52A and 52B in the charging circuit 52. When the process flow transitions from Step S11 to Step S13 and the charging process is not performed, the power supply control ECU 33 maintains the state. Then, the power supply control ECU 33 determines whether the ignition OFF state signal is input (Step S15). When the ignition OFF state signal is not input (Step S15: NO), the power supply control ECU 33 performs Step S3 again.

When it is determined in Step S10 that the first capacitor voltage Vc1 is less than the first threshold value Vth1 (Step S10: YES), the power supply control ECU 33 switches the auxiliary power supply switching circuit 56 to the first state (Step S14). When the auxiliary power supply switching circuit 56 includes four switching elements 56A to 56D illustrated in FIG. 3, the power supply control ECU 33 turns off the second and third switching elements 56B and 56C and turns on the first and fourth switching elements 56A and 56D. Then, the power supply control ECU 33 determines whether the ignition OFF state signal is input (Step S15). When the ignition OFF state signal is not input (Step S15: NO), the power supply control ECU 33 performs Step S3 again.

Figure 5:
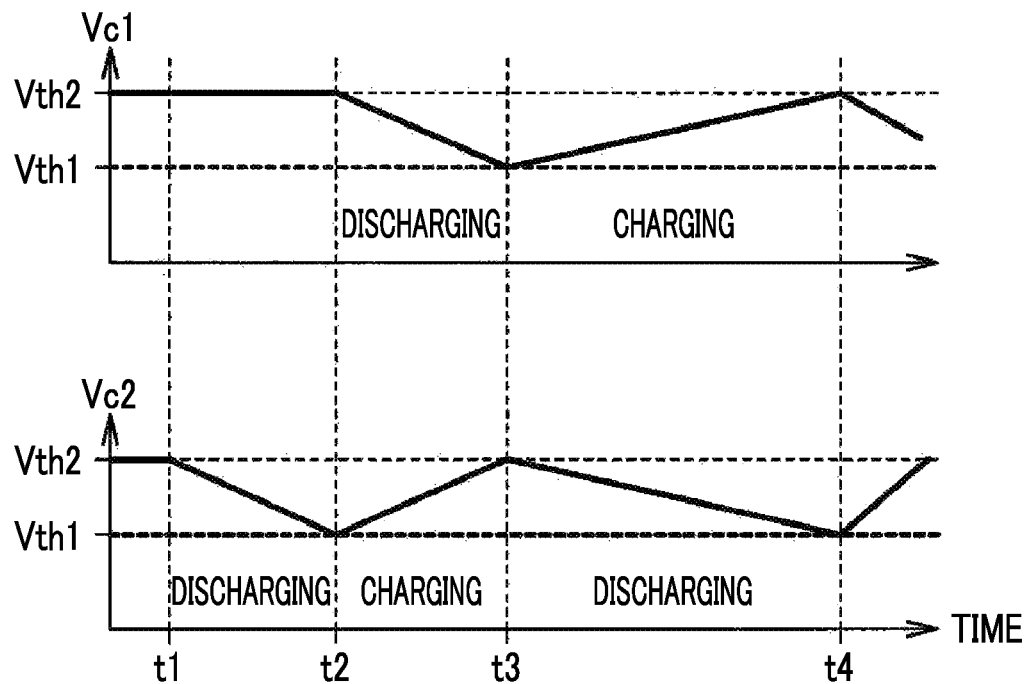
FIG. 5 is a timing chart illustrating a change example of capacitor voltages Vc1 and Vc2 of capacitors.

When it is determined in Step S15 that the ignition OFF state signal is input (Step S15: YES), the power supply control ECU 33 turns off the relay 51 (Step S16). FIG. 5 is a timing chart illustrating an example of a change of the capacitor voltages Vc1 and Vc2 of the capacitors 54 and 55.

When both the capacitor voltages Vc1 and Vc2 of the capacitors 54 and 55 are equal to or greater than the second threshold value Vth2 and the ignition ON state signal is input (time t1), the auxiliary power supply switching circuit 56 is set to the first state (see Steps S1 and S2). Accordingly, since discharging of the second capacitor 55 is started, the second capacitor voltage Vc2 decreases. Thereafter, when the second capacitor voltage Vc2 becomes less than the first threshold value Vth1 (time t2), the auxiliary power supply switching circuit 56 is switched to the second state (see Steps S5 and S9). Accordingly, discharging of the first capacitor 54 is started and charging of the second capacitor 55 is started. Accordingly, the first capacitor voltage Vc1 decreases and the second capacitor voltage Vc2 increases simultaneously.

Thereafter, when the first capacitor voltage Vc1 becomes less than the first threshold value Vth1 (time t3), the auxiliary power supply switching circuit 56 is switched to the first state (see Steps S10 and S14). Accordingly, discharging of the second capacitor 55 is started and charging of the first capacitor 54 is started. Accordingly, the second capacitor voltage Vc2 decreases and the first capacitor voltage Vc1 increases.

Thereafter, when the second capacitor voltage Vc2 becomes less than the first threshold value Vth1 (time t4), the auxiliary power supply switching circuit 56 is switched to the second state (see Steps S5 and S9). Accordingly, discharging of the first capacitor 54 is started and charging of the second capacitor 55 is started. Accordingly, the first capacitor voltage Vc1 decreases and the second capacitor voltage Vc2 increases. Thereafter, the same operations are repeated.

In the above-mentioned embodiment, since the first state in which the second capacitor 45 is dischargeable and the first capacitor 44 is chargeable and the second state in which the first capacitor 44 is dischargeable and the second capacitor 45 is chargeable are alternately switched, the auxiliary power supply device 32 can be maintained in the high output voltage state. Accordingly, it is possible to supply a high voltage, which is obtained by adding the first and second capacitor voltages to the voltage of the main power supply, to the motor driving circuit of the H-EPS ECU and to decrease a current which starts flowing from the main power supply.

Figure 6:
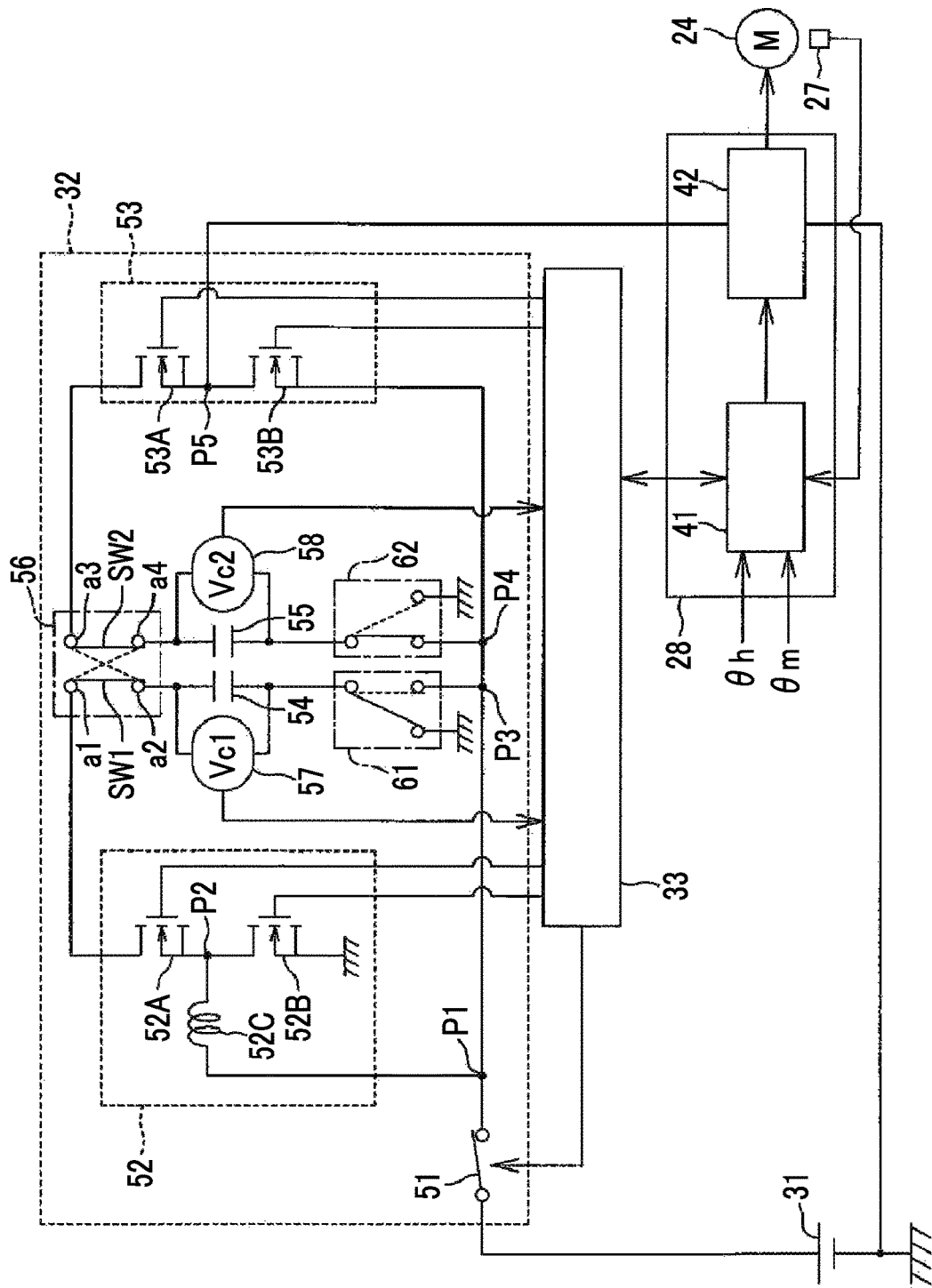
FIG. 6 is a circuit diagram illustrating a modified example of an electrical configuration of the electro-hydraulic power steering device.

FIG. 6 is a circuit diagram illustrating a modified example of the electrical configuration of the electro-hydraulic power steering device 1. In FIG. 6, elements corresponding to the elements illustrated in FIG. 2 are referenced by the same reference signs. The circuit illustrated in FIG. 6 is different from the circuit illustrated in FIG. 2, in that two switching switches 61 and 62 are added to the auxiliary power supply device 32. Specifically, in the auxiliary power supply device 32 illustrated in FIG. 6, a switching switch 61 is disposed between the negative electrode terminal of the first capacitor 54 and the connection point P3. In the auxiliary power supply device 32, a switching switch 62 is disposed between the negative electrode terminal of the second capacitor 55 and the connection point P4.

The switching switch 61 is a switch which is switched between a first state in which the negative electrode terminal of the first capacitor 54 is connected to the connection point P3 and a second state in which the negative electrode terminal of the first capacitor 54 is grounded. The switching switch 62 is a switch which is switched between a first state in which the negative electrode terminal of the second capacitor 55 is connected to the connection point P4 and a second state in which the negative electrode terminal of the second capacitor 55 is grounded.

The switching switches 61 and 62 are controlled by the power supply control ECU 33. Specifically, when the auxiliary power supply switching circuit 56 is set to the first state, the power supply control ECU 33 sets the switching switch 61 to the second state and sets the switching switch 62 to the first state as indicated by a solid line. That is, when the auxiliary power supply switching circuit 56 is set to the first state, the negative electrode terminal of the first capacitor 54 is grounded and the negative electrode terminal of the second capacitor 55 is connected to the main power supply 31.

On the other hand, when the auxiliary power supply switching circuit 56 is set to the second state, the power supply control ECU 33 sets the switching switch 61 to the first state and sets the switching switch 62 to the second state as indicated by a dotted line. That is, when the auxiliary power supply switching circuit 56 is set to the second state, the negative electrode terminal of the first capacitor 54 is connected to the main power supply 31 and the negative electrode terminal of the second capacitor 55 is grounded. In the modified example, since the auxiliary power supply is charged up to a voltage obtained by adding the voltage of the charging circuit 52 to the voltage of the main power supply 31, it is possible to discharge of a higher voltage to the motor driving circuit of the H-EPS ECU at the time of discharging and to further decrease the current which starts flowing from the main power supply.

While an embodiment of the disclosure has been described above, the disclosure may be modified in another embodiment. For example, in the above-mentioned embodiment, two channels of auxiliary power supplies are provided, but three or more channels of auxiliary power supplies may be provided. When three or more channels of auxiliary power supplies are provided, the auxiliary power supply switching circuit switches one channel of auxiliary power supply connected to the charging circuit 52 among the plurality of channels of auxiliary power supplies and simultaneously switches one channel of auxiliary power supply connected to the motor driving circuit 42 so as not to match the channel of auxiliary power supply connected to the charging circuit 52.

In the above-mentioned embodiment, one channel of auxiliary power supply is constituted by one capacitor, but one channel of auxiliary power supply may include two or more capacitors. In the above-mentioned embodiment, the auxiliary power supply is constituted by a capacitor, but the auxiliary power supply may be an auxiliary power supply other than a capacitor, such as all types of solid batteries or a lithium-ion battery. In the above-mentioned embodiment, the motor control circuit 41 sets the target rotation speed which is a target value of the rotation speed of the electric motor 24 based on the steering angular velocity, but the target rotation speed may be a fixed value which has been set in advance.

In the above-mentioned embodiment, the auxiliary power supply device according to the disclosure is applied to an electro-hydraulic power steering (H-EPS) device, but the disclosure may be applied to an electric power steering (EPS) device. That is, the auxiliary power supply device according to the disclosure can be used as an auxiliary power supply device for a driving circuit of an electric motor of an electric power steering device.

Various modifications in design can be added to the disclosure without departing from the description of the appended claims.

What is claimed is:
1. An auxiliary power supply device comprising:
a plurality of channels of auxiliary power supplies;
a charging circuit configured to charge the auxiliary power supplies, the charging circuit being connected to a main power supply; and
an auxiliary power supply switching circuit disposed between the charging circuit and positive electrode terminals of the plurality of channels of auxiliary power supplies and configured to switch one channel of auxiliary power supply connected to the charging circuit among the plurality of channels of auxiliary power supplies such that one auxiliary power supply that has been disconnected from the charging circuit is connected to the charging circuit and another auxiliary power supply that has been connected to the charging circuit is disconnected from the charging circuit, and to simultaneously switch one channel of auxiliary power supply connected to a power supply destination such that one auxiliary power supply that has been disconnected from the power supply destination is connected to the power supply destination, another auxiliary power supply that has been connected to the power supply destination is disconnected from the power supply destination, and the one channel of auxiliary power supply connected to the power supply destination does not match the one channel of auxiliary power supply connected to the charging circuit.

2. The auxiliary power supply device according to claim 1, wherein:
the plurality of channels of auxiliary power supplies include a first auxiliary power supply and a second auxiliary power supply; and
the auxiliary power supply switching circuit is configured to switch a state of the first auxiliary power supply and the second auxiliary power supply between a first state and a second state;
in the first state, the first auxiliary power supply is connected to the charging circuit, the second auxiliary power supply is not connected to the charging circuit, the second auxiliary power supply is connected to the power supply destination, and the first auxiliary power supply is not connected to the power supply destination; and
in the second state, the first auxiliary power supply is connected to the power supply destination, the second auxiliary power supply is not connected to the power supply destination, the second auxiliary power supply is connected to the charging circuit, and the first auxiliary power supply is not connected to the charging circuit.

3. A power supply system comprising:
the auxiliary power supply device according to claim 2;
a first voltage detector configured to detect a first voltage which is an inter-terminal voltage of the first auxiliary power supply;
a second voltage detector configured to detect a second voltage which is an inter-terminal voltage of the second auxiliary power supply; and
a control device configured to control the auxiliary power supply device,
wherein the control device is configured to switch the auxiliary power supply switching circuit to the second state when the auxiliary power supply switching circuit is in the first state and the second voltage detected by the second voltage detector decreases to a value less than a predetermined first threshold value, and to switch the auxiliary power supply switching circuit to the first state when the auxiliary power supply switching circuit is in the second state and the first voltage detected by the first voltage detector decreases to a value less than the predetermined first threshold value.

4. The power supply system according to claim 3, wherein the control device controls the charging circuit such that the first auxiliary power supply is charged only when the auxiliary power supply switching circuit is in the first state and the first voltage detected by the first voltage detector is less than a predetermined second threshold value and controls the charging circuit such that the second auxiliary power supply is charged only when the auxiliary power supply switching circuit is in the second state and the second voltage detected by the second voltage detector is less than the second threshold value.

\* \* \* \* \*